United States Patent [19]

Bergman

[11] Patent Number: 4,847,806
[45] Date of Patent: Jul. 11, 1989

[54] METHOD AND APPARATUS FOR GIVING IDENTITY TO, AND SELECTING ONE OF A PLURALITY OF FUNCTION UNITS

[75] Inventor: Jan L. Bergman, Enebyberg, Sweden

[73] Assignee: Telefonaktiebolaget LM Ericsson, Stockholm, Sweden

[21] Appl. No.: 134,831

[22] Filed: Dec. 18, 1987

Related U.S. Application Data

[63] Continuation of Ser. No. 868,128, May 28, 1986, abandoned, which is a continuation of Ser. No. 540,206, Oct. 7, 1983, abandoned.

[30] Foreign Application Priority Data

Feb. 12, 1982 [SE] Sweden ............................... 8200870

[51] Int. Cl.⁴ .................................................. G06F 13/00
[52] U.S. Cl. ..................................................... 364/900
[58] Field of Search ... 364/200 MS File, 900 MS File

[56] References Cited

U.S. PATENT DOCUMENTS

| | | | |
|---|---|---|---|
| 3,609,704 | 9/1971 | Schurter | 364/200 |
| 3,868,641 | 2/1975 | Hagelin | 340/825.5 |
| 3,993,981 | 11/1976 | Cassarino et al. | 364/200 |
| 4,041,469 | 8/1977 | Jennings | 364/900 |
| 4,053,947 | 10/1977 | Werner | 364/200 |
| 4,063,081 | 12/1977 | Handly | 371/16 |
| 4,165,533 | 8/1979 | Jonsson | 364/900 |
| 4,168,532 | 9/1979 | Dempsey et al. | 364/900 |
| 4,251,865 | 2/1981 | Moore et al. | 364/900 |
| 4,271,482 | 6/1981 | Giraud | 364/900 |
| 4,437,157 | 3/1984 | Witalka et al. | 364/200 |
| 4,468,750 | 8/1984 | Chamoff et al. | 364/900 |
| 4,521,846 | 6/1985 | Scalzi et al. | 364/200 |

Primary Examiner—David Y. Eng
Attorney, Agent, or Firm—Roberts, Spiecens & Cohen

[57] ABSTRACT

A stored program controlled system has its control unit (1) connected to a plurality of function units (2) via an information bus (6) for transferring control information and via an addressing means (7) which converts an address number assigned to one of the function units into an access signal which is sent to said function unit. Incorrect information reception in the function units is avoided and system handling facilitated by means of giving identity to the function units every time the system is started. The control unit includes a number pair generator (5) for generating an identification number parallel with the address number, which number pair is assigned to the same function unit. The identification number is transferred via the information bus (6) and is registered during system starting in a registering means (11, 12) included in said function unit. The function unit includes a converter (15–18) for converting the access signal during system operation to a selection signal only if the identification number obtained from the number pair generator (5) agrees with the identification number stored in the registering means (11, 12). The selection signal activates the function unit for reception of control information.

1 Claim, 1 Drawing Sheet

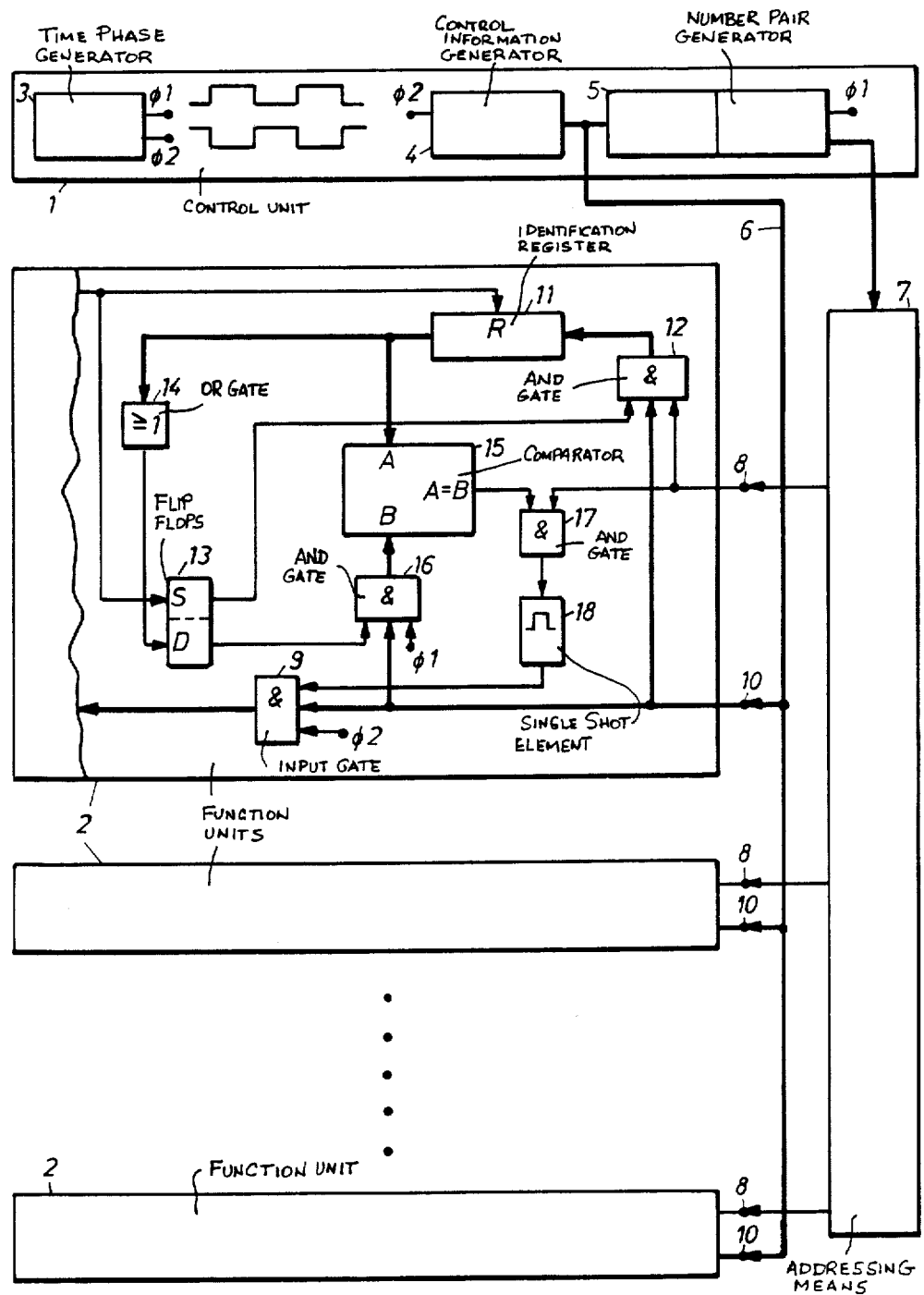

METHOD AND APPARATUS FOR GIVING IDENTITY TO, AND SELECTING ONE OF A PLURALITY OF FUNCTION UNITS

This is a Continuation on application serial No. 868,128 filed May 28, 1986, now abandoned, which is a Continuation on application serial No. 540,206 filed Oct. 7, 1983, now abandoned.

FIELD OF INVENTION

The present invention relates to a method and an apparatus for giving identity to and selecting one of a plurality of function units included in a stored program controlled telecommunication system, the function units being connected to a control unit via an addressing means and via an information bus. The control unit generates control periods and sends, during one of the control periods, an address number assigned to such function unit as well as control information intended for this function unit. The addressing means converts the address number to an access signal which is sent to the function unit. The information bus transfers the control information in digital form to the function units.

BACKGROUND ART

In such a known stored program controlled system, e.g., as described in U.S. Pat. No. 4,053,947, the address and control information is read from an instruction memory. The known information bus includes a data bus and an order bus for transferring control information to interface means of the function units. The known addressing means includes an address bus for transferring the address to all the function units of the system and includes address decoders, each of which is arranged in its interface means. Each of the address decoders generates an access signal only if the address bus transfers the address number associated with its function unit. The access signal is used to control an input gate arranged in this function unit, this gate being connected to the information bus such that in an activation state it feeds its function unit with the intended control information.

Relatively easily remedied system errors occur if a correctly addressed function unit receives incorrect control information, thus executing an incorrect function. In this case the remaining function units of the system will be unaffected. However, if the addressing process is executed incorrectly, a serious operational error occurs. The intended function unit, which has then not received an access signal, does not carry out the intended function, but some other unidentified function unit will be disturbed in its ordinary functional performance. To achieve greater security against the unintentional selection of a function unit, it is already known, e.g., from the U.S. Pat. Nos. 3,868,641 and 4,165,533, to provide each of the function units with duplicated address decoders.

SUMMARY OF INVENTION

One of the objects of the present invention is to still further improve the security against incorrect function unit selection in the above indicated type of equipment by means of giving indentity to the function units for every system start. Another object is to make, by means, of such identity assignment, the system easier to handle in conjunction with constructing, repairing, maintaining, technically improving or extending the system.

The above-mentioned duplication of the address decoders gives good security against selection error providing that only the decoders can cause errors in the addressing process. The risk of error is however at least just as great in conjunction with address number generation in the system control unit and in conjunction with the address number transfer via an address bus. A trivial, but expensive safety measure would be to duplicate the whole of the addressing process, i.e., to introduce a duplicated address number generation means and a duplicated addressing means. If the addressing means includes an address bus, the bus duplication would constitute the portion of the total duplication requiring most cost.

With the aid of the present invention there is obtained the effect of the total duplication without having to duplicate the addressing means. It will be seen from the claims that the invention is essentially characterized by the use of the information bus to transfer an identification number which is assigned to the function unit, the address number of which is received in parallel by the addressing means. For a system put in operation in accordance with the invention, each of the function units stores its identification number, and a function unit is selected for carrying out the function determined by the control information, only if the addressing means generates the associated access signal and if the identification number transferred simultaneously on the information bus agrees with the identification number stored in the function unit. Giving identity to the function units is done in conjunction with starting the system or re-starting after a break down, for example.

The invention is not affected by the programming of the system, i.e., by setting up successive control information and associated address and identification number sequences. It is possible to use different control information sequences for the same functional programs during different operating periods of the system. It is further possible to establish a new co-ordination of the address and identification numbers for each new operational period. It is conceivable, for example, that a fundtion unit is given an entirely new address-identification number pair after repairs. A function unit's address is in principle dependent on the one of the addressing means outputs to which the function unit is connected. The identification number of the function unit can however be determined anew at each starting occasion, independent of the address. There is thus obtained in accordance with the invention a new stored program controlled system with greater security against incorrect function unit selection, which furthermore is easier to handle than conventional systems.

BRIEF DESCRIPTION OF DRAWING

The invention will next be described with reference to the appended drawing, in which a plurality of function units to which a control unit periodically sends addresses, control information and identification numbers. The drawing further shows how one of the function units is selected during the start and operational condition, respectively, for receiving its identification number and information intended for this function unit.

DETAILED DESCRIPTION

A stored program controlled telecommunication system in accordance with the invention includes a control unit 1 which sends, in addition to address numbers and control information, identification numbers to a plurality of function units 2. The drawing indicates that the control unit includes a time phase generator 3, both outputs of which are activated alternatingly. A phase pulse 01 obtained from one output together with the following phase pulse 02 obtained from the second output define a control period for selecting one of the function units and also for transferring control information to the selected function unit. The drawing further indicates that the control unit includes a control information generator 4 which, in time with the phase pulses 02, generates control information in digital form, and a number pair generator 5 which, in time with the phase pulse 01, generates digital address and identification numbers, one number pair for each 01 pulse with each number pair being assigned to one of the function units.

The control information generator 4 has its output connected to an information bus 6. The number pair generator 5 is connected to an addressing means 7 to send there-to via one of its outputs address numbers. The other output identification numbers is connected to said information bus 6. The outputs of the addressing means 7, each of which is connected to a first terminal 8 of a function unit, sends access signals, the function unit with an assigned address number receiving an access signal when the addressing means receives this address number. The function units have their control information input gates 9 connected in parallel to the information bus 6 via their second terminals 10. There is thus obtained that, during a control period phase pulse 01 an access signal is sent to one of the function units and an identification number to all the function units, as well as that during the phase pulse 02, associated with the same control period, control information is sent to all the input gates of the function units.

Each function unit 2 includes an identification register 11, the input of which is connected via a first AND gate 12 to the second terminal 10 of the function unit. In accordance with the invention, a starting period to give identity to the function units goes before each of the system operational periods. In the drawing, this division into starting and operational periods is symbolized with the aid of flip-flops 13, arranged each in its function unit, which are internally and in conjunction with each system start or restart put into the state denoted by "S" in the drawing. Simultaneously, the contents of such identification register 11 is erased internally via its reset terminal denoted on the drawing by "R". The first AND gate 12 is activated when the flip-flop is in the "S" state and the function unit receives an access signal via its first terminal 8.

During the starting period the control unit 1 sends all the address identification number pairs of the function units, one at a time, so that at the end of the starting period each of the function units stores its identification number in its identification register. The the drawing there is indicated that an arbitrary loading of the register 11 results in that the flip-flop 13 is put in the state denoted by "D" by means of an OR gate 14, i.e., in other words once the register 11 is loaded the flip-flop is put in the D-state.

Each function unit further includes a comparator 15, the first input of which is connected to the output of the identification register and the second input of which is connected via a second AND gate 16 to the second terminal 10 of the function unit. AND gate 16 is activated during the phase pulses 01 and when the flip-flop 13 is in the "D" state, i.e., during the operational periods of the system. The comparator output is consequently activated during the operational period each time the information bus transfers the identification number assigned to the function unit.

There is finally shown in the drawing that each function unit includes a third AND gate 17, the inputs of which are connected to the first terminal 8 of the function unit and the output of the comparator 15. The output of gate 17 is connected to a single-shot ("one shot") element 18. There is thus obtained that AND gate 17 is activated at the beginning of a control period only if the function unit receives an access signal and its identification number during an operational period of the system. The single-shot element 8 extends the signal generated by AND gate 17 into a selection signal which embraces the phase pulse 02 of the control information input gate 9 of the function unit.

What is claimed is:

1. In the stored program controlled telecommunication system having a plurality of addressable function units connected, via an addressing means for converting address numbers to access signals and via an information bus for transferring control information, to a control unit for generating control periods and for sending, during one of the control periods, to said addressing means an address number assigned to one of the function units, as well as for sending, during said control period, to said information bus control information intended for the function unit addressed by said address number, a method of giving identity to and selecting said function unit to accept the control information intended for the function unit in addition to address signals sent from said addressing means to select a respective said function unit, said method comprising the steps of:

(a) during the control period, generating in the control unit and second to the information bus an identification number assigned to said function unit;

(b) sending to said function unit when said control period occurs during the starting of the system the identification number present on said information bus when said addressing means produces and sends a signal to said function unit based on an address signal assigned thereto, (c) storing the identification number in said function unit, (d) comparing in said function unit the identification number stored therein with the identification number present on said information bus, when said control period occurs during operation of the system, (e) converting in said function unit the signal received from said addressing means to a selection signal only if equality is established by said comparing, (f) and using in said function unit the selection signal for activating the reception of the control information present on said information bus, wherein during starting of the system the function unit receives the identification number signal in response to an address signal and during subsequent operation the function unit receives control information in response to both identification number signals and address signals.

* * * * *